US012542484B2

(12) United States Patent
Zeng

(10) Patent No.: US 12,542,484 B2
(45) Date of Patent: Feb. 3, 2026

(54) POWER SUPPLY ARCHITECTURE OF TWO-STAGE VOLTAGE REDUCTION SERIES STRUCTURE AND POWER MODULE USING THE SAME

(71) Applicant: MetaPWR Electronics Co., Ltd., Shanghai (CN)

(72) Inventor: Jianhong Zeng, Shanghai (CN)

(73) Assignee: MetaPWR Electronics Co., Ltd., Shanghai (CN)

( * ) Notice: Subject to any disclaimer, the term of this patent is extended or adjusted under 35 U.S.C. 154(b) by 186 days.

(21) Appl. No.: 18/412,570

(22) Filed: Jan. 14, 2024

(65) Prior Publication Data
US 2024/0243657 A1 Jul. 18, 2024

(30) Foreign Application Priority Data

Jan. 16, 2023 (CN) .......................... 202310078725.1

(51) Int. Cl.
*H02M 1/00* (2007.01)
*H02M 3/155* (2006.01)

(52) U.S. Cl.
CPC .......... *H02M 3/155* (2013.01); *H02M 1/0045* (2021.05); *H02M 1/007* (2021.05); *H02M 1/0074* (2021.05); *H02M 1/008* (2021.05)

(58) Field of Classification Search
CPC .. H02M 1/0045; H02M 1/007; H02M 1/0074; H02M 1/008
See application file for complete search history.

(56) References Cited

U.S. PATENT DOCUMENTS

| 2015/0280572 | A1* | 10/2015 | Plesnik | H02M 3/33569 363/21.03 |
| 2015/0365003 | A1* | 12/2015 | Sadwick | H02M 3/28 363/21.01 |
| 2016/0294295 | A1* | 10/2016 | Zeng | H02M 3/33571 |
| 2017/0012442 | A1* | 1/2017 | Zeng | H02M 1/14 |
| 2017/0310227 | A1* | 10/2017 | Zhang | H02M 3/1584 |
| 2021/0081013 | A1* | 3/2021 | Wang | G06F 1/263 |

* cited by examiner

*Primary Examiner* — Gary A Nash
(74) *Attorney, Agent, or Firm* — JCIPRNET

(57) ABSTRACT

A power supply architecture comprises at least two series combinations. Each series combination comprises at least one front-stage circuit unit and at least one post-stage circuit unit, and the input ends of the front-stage circuit units are electrically connected; and the front-stage circuit unit is used for converting an input voltage to an intermediate voltage; the front-stage circuit unit comprises a front-stage power semiconductor and a front-stage passive circuit element which are electrically connected with each other, and the post-stage circuit unit is used for converting the intermediate voltage to a output voltage; and the post-stage circuit unit comprises a post-stage power semiconductor and a post-stage passive circuit element which are electrically connected with each other; and in each series combination, the output end of the front-stage circuit unit and the input end of the post-stage circuit unit are electrically connected through a low-loss electric connector.

27 Claims, 13 Drawing Sheets

POWER SUPPLY ARCHITECTURE OF TWO-STAGE VOLTAGE REDUCTION SERIES STRUCTURE AND POWER MODULE USING THE SAME

CROSS-REFERENCE TO RELATED APPLICATION

This application claims the priority benefit of China application serial no. 202310078725.1 filed on Jan. 16, 2023. The entirety of the above-mentioned patent application is hereby incorporated by reference herein and made a part of this specification.

BACKGROUND

Technical Field

The invention relates to a high-frequency power supply, in particular to a power supply architecture of two-stage voltage reduction series structure and power module using the same.

Description of Related Art

At present, with the development of artificial intelligence, intelligent data processing chips, such as GPU CPU NPU and the like (collectively referred to as XPU), have increasingly power requirements, so that the power of a server is increased, and power is gradually supplied from 12V to 48V for power supply. The operating voltage of the XPU becomes increasingly lower with the process improving. Therefore, the power supply voltage difference becomes larger and larger, so that the two-stage circuit becomes mainstream step by step.

In the prior art, as shown in FIG. 1A, in order to consider the traditional 12V power supply, the first stage converts 48V into a 12V bus, and then the 12V bus is converted into low voltage. However, as the XPU power supply frequency is increased, the frequency of the 12V buck circuit is limited, and the working frequency is usually less than 2 MHZ, so that the bus voltage drops from 12V to a new trend, for example, the voltage drops to 5V, as shown in FIG. 1B, the frequency of the buck circuit can be higher than 2 MHz, 4 MHZ, or even 10 MHz or more.

However, the bus voltage drops, so that the current of the bus rises greatly, the transmission loss becomes large, and the use of the scheme is hindered.

As shown in FIG. 2A and FIG. 2B, the transformer of the front-stage DC/DC converts the input voltage Vin into a bus voltage Vbus (i.e., an intermediate voltage). Because of the large current, a plurality of output windings and sub-units composed of the rectifier devices are often required to supply the power together. The currents of these subunits are converged together to the total output of the front-stage DC/DC, that is, Bus, and then respectively provided to each Buck circuit. The large current of Bus is converged and then shunted, resulting in additional transmission inductance and resistance, resulting in increased loss and slow dynamic response, thereby limiting the continuous drop of Vbus voltage, limiting the working frequency increase of the post-stage Buck, limiting the dynamic response capability of the converter, and requiring more output capacitors.

SUMMARY

In general, one aspect features a power supply architecture of the two-stage voltage reduction series structure, comprising:

at least two series combinations, wherein each series combination comprises at least one front-stage circuit unit and at least one post-stage circuit unit, and the input ends of the front-stage circuit units are electrically connected;

wherein the front-stage circuit unit is used for converting an input voltage to an intermediate voltage;

wherein the post-stage circuit unit is used for converting an intermediate voltage to an output voltage;

wherein the front-stage circuit unit comprises a front-stage power semiconductor and a front-stage passive circuit element which are electrically connected with each other, and the post-stage circuit unit comprises a post-stage power semiconductor and a post-stage passive circuit element which are electrically connected with each other;

wherein each series combination, the output end of the front-stage circuit unit and the input end of the post-stage circuit unit are electrically connected through a low-loss electric connector. The low-loss electric connector is used for indicating the series connection relation between the front-stage circuit unit and the post-stage circuit unit on the circuit structure, a corresponding implementation mode in the entity physical structure does not limit the series connection relation between the front-stage circuit unit and the post-stage circuit unit and comprises an element with a certain special function, and the welding piece is a corresponding low-loss electric connector if series connection is achieved in a nearby welding mode.

The key point of the power supply architecture lies in that one bus in the prior art is replaced with a plurality of buses, and an independent bus can be further distributed to each post-stage circuit unit, so that the current of each bus is reduced, the path length of the bus in the module can be shortened, and the parasitic resistance and the parasitic inductance are greatly reduced.

Preferably, the working frequency of the front-stage circuit unit is an integral multiple of the post-stage circuit unit, or the working frequency of the post-stage circuit unit is an integral multiple of the front-stage circuit unit.

Preferably, the post-stage circuit unit is a Buck circuit unit.

Preferably, the front-stage circuit unit is a DC/DC converter unit;

wherein the front-stage passive circuit element comprises a front-stage capacitor, and wherein the front-stage power semiconductor comprises a rectifying element;

wherein the front-stage passive circuit element further comprises a primary winding and a secondary winding corresponding to the primary winding, and the primary winding and the corresponding secondary winding are coupled nearby;

wherein the secondary winding and the rectifying element are connected in series and then connected to the two ends of the front-stage capacitor in parallel;

wherein the primary windings of the front-stage circuit units are mutually connected in series and form a transformer unit together with the corresponding secondary windings;

wherein the voltage output end of the front-stage capacitor is electrically connected with the voltage input end of the corresponding Buck circuit unit in the same series combination through a low-loss electric connector Preferably, at least two Buck circuit units are first Buck circuit units, the first Buck circuit units jointly receive the same PWM signal for control, and the first Buck circuit units are respectively in different series combinations.

Preferably, the low-loss electric connector corresponding to the first Buck circuit unit is a first electric connector, and the interconnection resistance between the first electric connectors is larger than 10 times of the maximum resistance of the first electric connector.

Preferably, the total number of different PWM signals is m, and m satisfies a formula (1):

$$0.8\ \text{V}in/\text{V}o \leq m \leq 2\ \text{V}in/\text{V}o; \tag{1}$$

wherein Vin is an input voltage, and Vo is an output voltage;

wherein for each series combination, if the series combination comprises more than one Buck circuit unit, the mutually staggered phases of the PWM signals received by each Buck circuit unit included in the series combination are mutually staggered.

Preferably, the current sampling output of each first Buck circuit unit is controlled by the same current loop after being summarized.

Preferably, the Buck circuit unit is set to be in different on or off states to different load states;
wherein the DC/DC converter circuit unit is a resonant circuit unit, and the working frequency of the resonant circuit unit is set to be different preset values to the on or off state of the Buck circuit unit.

Preferably, the front-stage circuit unit is a first Buck circuit unit, and the post-stage circuit unit is a second Buck circuit unit;
wherein the front-stage passive circuit element comprises a first Buck inductor, and the post-stage passive circuit element comprises a second Buck inductor;
wherein the voltage output end of the first Buck inductor is electrically connected with the voltage input end of the corresponding second Buck circuit unit in the same series combination through a low-loss electric connector.

In general, another aspect features a power module applying the power supply architecture further comprising a substrate;
wherein the front-stage power semiconductor is disposed above the substrate and/or inside the substrate;
wherein the post-stage passive circuit element is disposed below the substrate, and at least a portion of the front-stage passive circuit element is located below the substrate.

Preferably, the post-stage passive circuit elements are arranged in an aggregation mode, and the front-stage passive circuit elements are arranged around the post-stage passive circuit elements in a surrounding mode.

Preferably, the post-stage passive circuit element is arranged in a one-dimensional array, and the front-stage passive circuit element is arranged in an array on at least one side of the array of the post-stage passive circuit element.

Preferably, the post-stage passive circuit element is stacked below the corresponding front-stage passive circuit element.

Preferably, the voltage input end of the front-stage circuit unit is located on the upper surface of the power module;
And the power module comprises a radiator arranged above the substrate, wherein the radiator is thermally connected with the front-stage power semiconductor, the lower surface of the radiator at least covers the substrate, an input voltage electrical connector is arranged in the radiator, one end of the input voltage electrical connector is electrically connected with the voltage input end of the power module, and the other end of the input voltage electrical connector extends out of the side surface of the radiator or extends out of the part, not covering the substrate, of the lower surface of the radiator or extends out of the upper surface of the radiator.

Preferably, the power module further comprising a plastic package body, wherein at least a part of the front-stage power semiconductor is arranged above the substrate, the plastic package body is arranged on the upper surface of the substrate, and the plastic package body wraps the front-stage power semiconductor arranged above the substrate.

Preferably, the power module further comprising a pin adapter board;
wherein the pin adapter board is arranged at the bottom of the power module, and the pin adapter board is electrically connected with the front-stage circuit unit and the post-stage circuit unit respectively.

In general, another aspect features a power module applying the power supply architecture further comprising a substrate, wherein the front-stage power semiconductor is arranged above the substrate and/or in the substrate, the front-stage capacitor is arranged below the substrate, and at least one part of the transformer unit is located below the substrate.

Preferably, the front-stage capacitor is arranged on at least one side of the transformer unit;
wherein the post-stage passive circuit element comprises a Buck inductor, the Buck inductor is arranged in an array, and the Buck inductor is stacked below the front-stage capacitor and/or the transformer unit;
wherein the post-stage power semiconductor is arranged on at least one side surface of a stack formed by a substrate, a front-stage capacitor, a transformer unit and a Buck inductor.

Preferably, the Buck inductor is provided with a single-turn Buck inductance winding, and the alternating current end of the Buck inductance winding is arranged on the first side surface of the Buck inductor;
wherein the DC end of the Buck inductance winding is arranged on the lower surface of the Buck inductor and is close to the second side surface opposite to the first side surface.

Preferably, the Buck inductor is arranged in an array according to the mode that the first side surfaces of the adjacent Buck inductors are alternately arranged left and right.

Preferably, the post-stage power semiconductor is disposed above the substrate and/or inside the substrate.

Preferably, the front-stage power semiconductor and the post-stage power semiconductor are subjected to heat dissipation through liquid immersion cooling.

Preferably, the front-stage circuit unit further comprising a high-voltage-side element, the high-voltage-side element is electrically connected with the primary winding, and the high-voltage-side element comprises a high-voltage conversion power semiconductor and a higher element which are electrically connected with each other;
wherein at least one side of the transformer unit is provided with a higher element;
wherein at least a portion of the higher element is disposed below the substrate;
wherein the high-voltage conversion power semiconductor is arranged above the substrate; compared with the transformer unit, the high-voltage conversion power semiconductor and the higher element are arranged on the same side, and the higher element is an auxiliary power supply and/or a resonant capacitor and/or a high-voltage direct-current capacitor.

Preferably, the electrode of the front-stage capacitor is arranged on the side edge, and the low-loss electric connector is an electrode of the front-stage capacitor.

Preferably, the post-stage passive circuit element further comprising an output capacitor, and the output capacitor is arranged below the Buck inductor.

Preferably, the power module further comprising a controller unit;

wherein the controller unit is arranged on at least one side of a stacked body jointly formed by the substrate, the front-stage capacitor, the front-stage transformer unit and the Buck inductor.

The details of one or more embodiments of the invention are set forth in the accompanying drawings and description below. Other features, objects, and advantages of the invention will be apparent from the description and drawings, and from the claims.

DESCRIPTION OF THE EMBODIMENTS

Figure 1A:
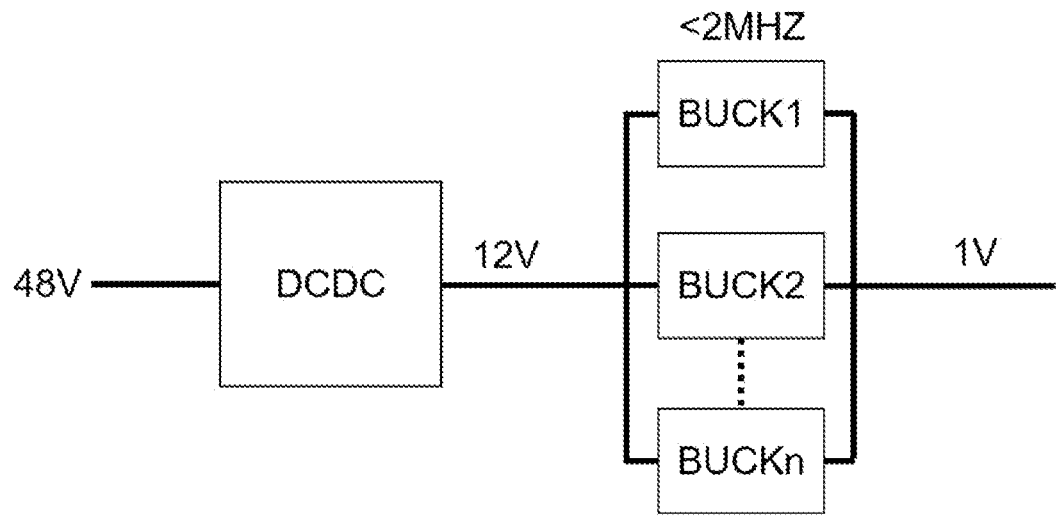
FIG. 1A to FIG. 1B are schematic diagrams of a two-stage architecture in the prior art.
Figure 1B:
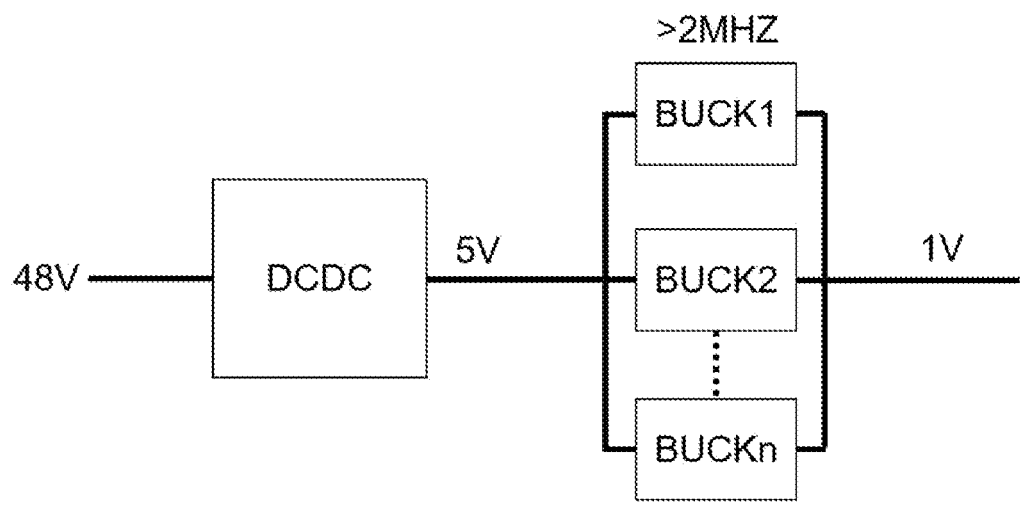
Figure 2A:
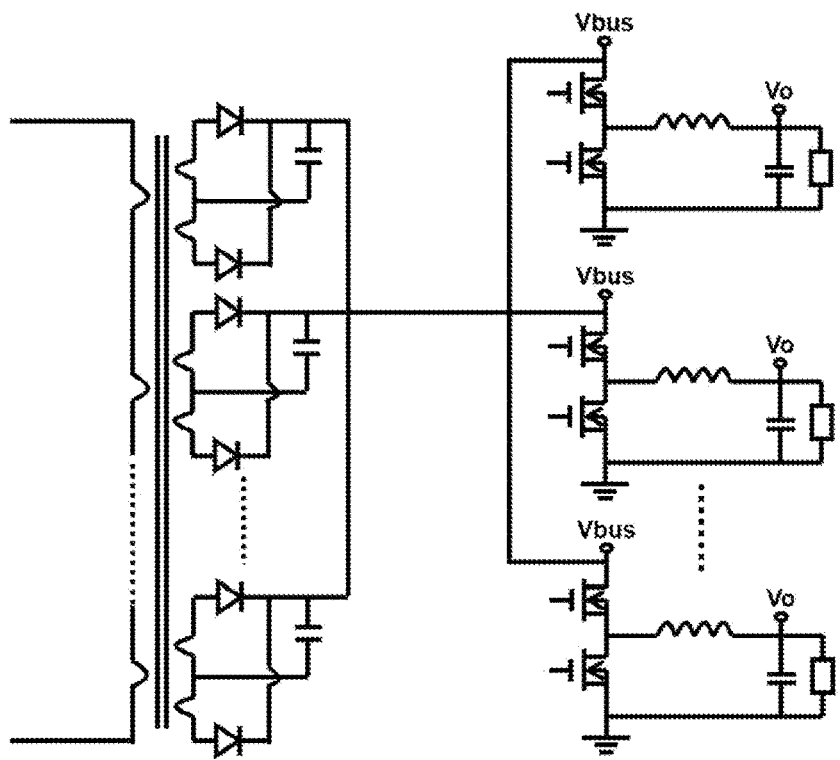
FIG. 2A to FIG. 2B are schematic circuit diagrams in the prior art.
Figure 2B:
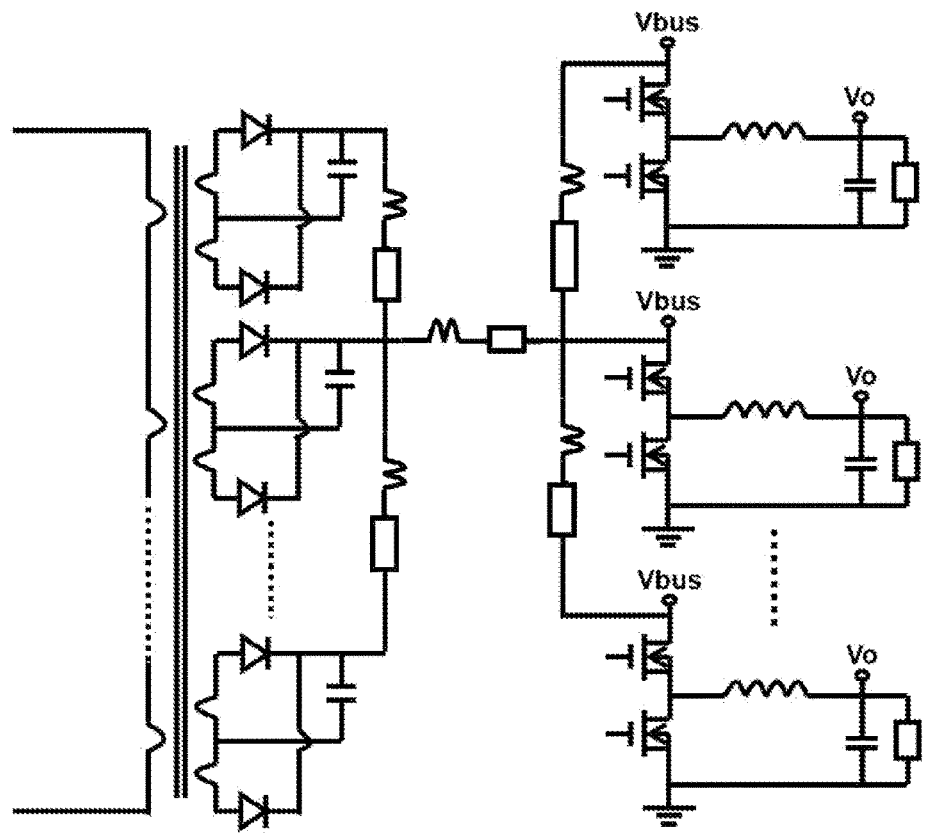

The present application discloses various embodiments or examples of implementing the thematic technological schemes mentioned. To simplify the disclosure, specific instances of each element and arrangement are described below. However, these are merely examples and do not limit the scope of protection of this invention. For instance, a first feature recorded subsequently in the specification formed above or on top of a second feature may include an embodiment where the first and second features are formed through direct contact, or it may include an embodiment where additional features are formed between the first and second features, allowing the first and second features not to be directly connected. Additionally, these disclosures may repeat reference numerals and/or letters in different examples. This repetition is for brevity and clarity and does not imply a relationship between the discussed embodiments and/or structures. Furthermore, when a first element is described as being connected or combined with a second element, this includes embodiments where the first and second elements are directly connected or combined with each other, as well as embodiments where one or more intervening elements are introduced to indirectly connect or combine the first and second elements.

Embodiment 1

Figure 3A:
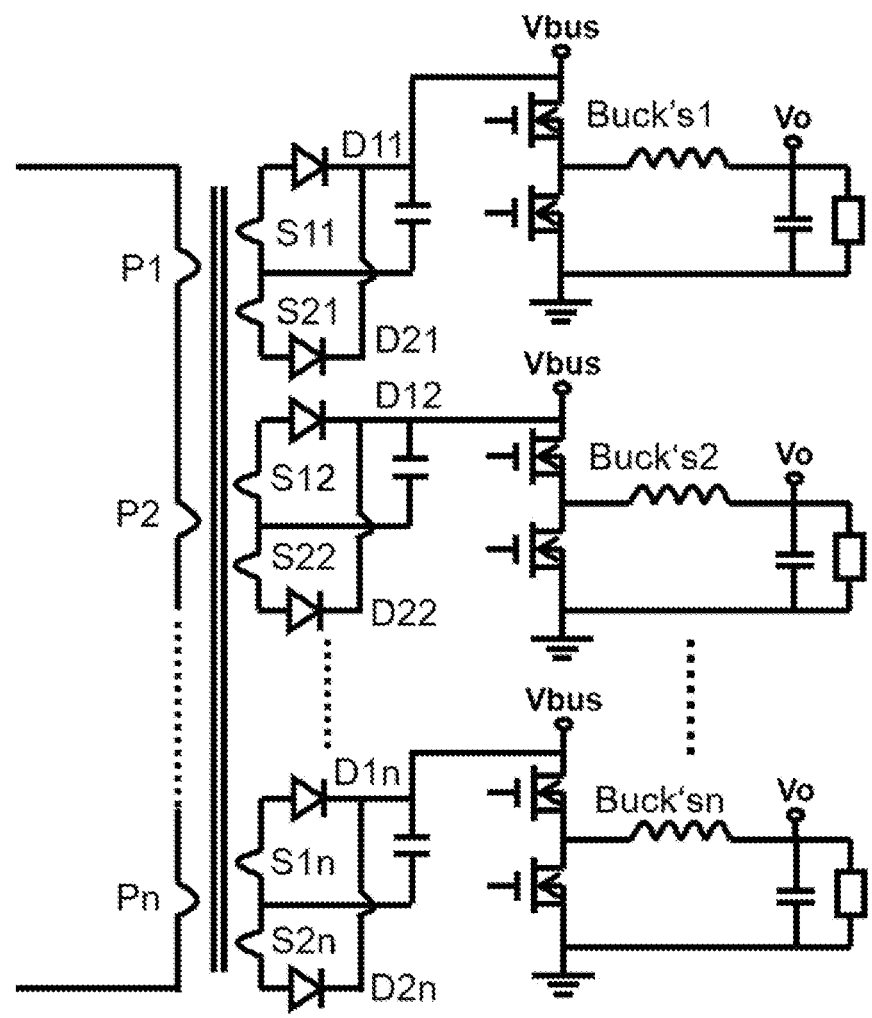
FIG. 3A to FIG. 3B are schematic circuit diagrams according to one or more embodiments.
Figure 3B:
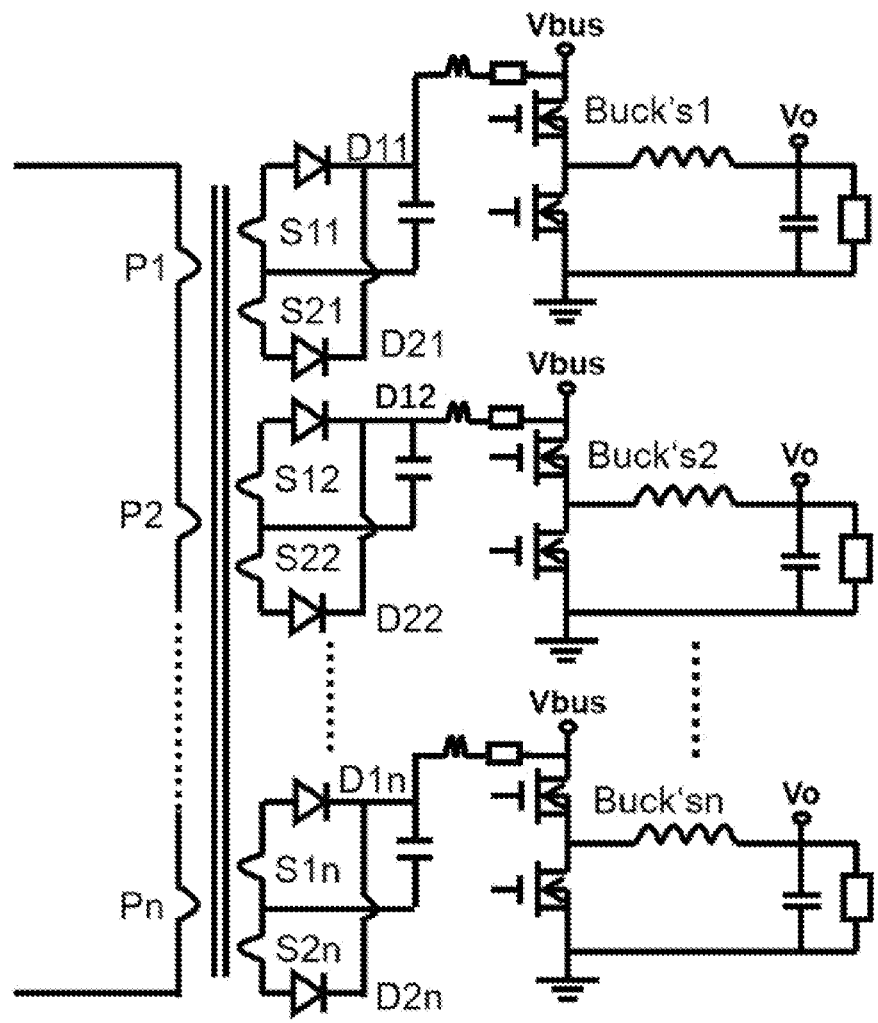

FIG. 3A and FIG. 3B show schematic diagrams of a power supply architecture. A plurality of sub-outputs of the DC/DC converter unit respectively provide energy to each Buck circuit unit. In this way, the path between each sub-outputs and corresponding Buck circuit unit is short, and the current flowing in each path is small, and the transmission inductance and the resistance are greatly reduced. If the number of the DC/DC converter units and the number of the Buck circuit units are respectively 4, the parasitic inductance and the parasitic resistance of the invention can be reduced by about 16 times compared with the traditional scheme. Under the same transmission loss, the Vbus is allowed to be reduced by four times, namely, 12V is reduced to 3V or even lower.

Figure 4A:
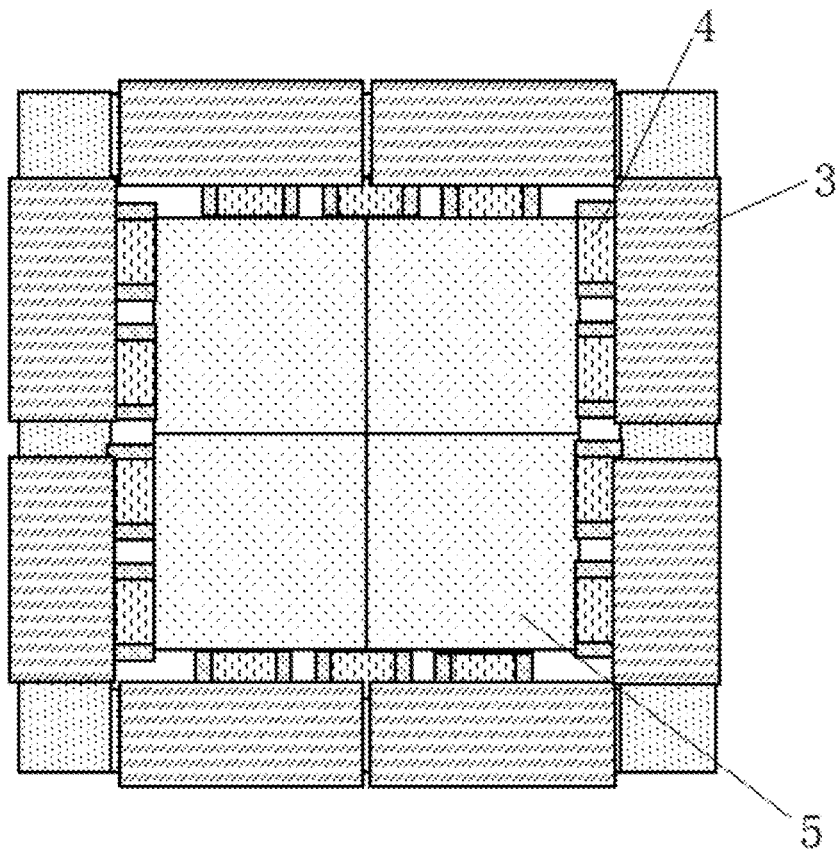
FIG. 4A to FIG. 4E are schematic structural diagrams according to one or more embodiments.
Figure 4B:
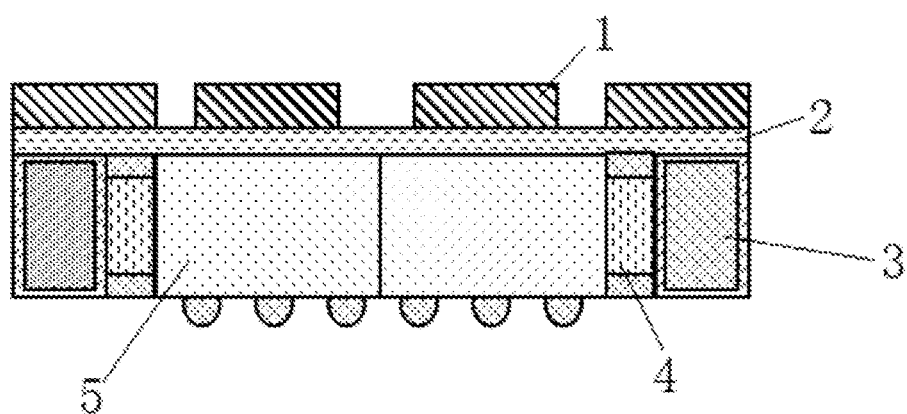

FIG. 4A and FIG. 4B illustrate the structure of this embodiment (FIG. 4A is a top view after removing a portion above a substrate 2, and FIG. 4B is a side-view cross-sectional view), comprising a substrate 2, eight DC/DC converter units (front-stage) and four Buck circuit units (post-stage), wherein each two DC/DC converter units and one Buck circuit unit form a series combination; the output ends of the Buck circuit units are connected in parallel, and the input ends of the DC/DC converter units are electrically connected; the DC/DC converter unit comprises a DC/DC power semiconductor 1 (comprising a rectifying element) and a front-stage capacitor 4 which are electrically connected with each other, and the Buck circuit unit comprises a post-stage power semiconductor (comprising a driving MOS, namely a DrMOS) and a Buck inductor 5 which are electrically connected with each other (further comprising an output capacitor arranged below the Buck inductor in an array); the primary winding and the corresponding secondary winding are coupled nearby; the secondary winding and the rectifying element are connected in series and then connected to the two ends of the front-stage capacitor in parallel; the primary windings are mutually connected in series and form a transformer unit 3 together with the corresponding secondary windings; and in the same series combination, the voltage output end of the front-stage capacitor is welded to the voltage input end of the Buck circuit unit nearby.

FIG. 4A shows a horizontal layout of a primary passive circuit element of this embodiment; the DC/DC power semiconductor 1 is arranged above the substrate 2, the Buck inductor 5 is arranged in an aggregation mode, the transformer unit 3 surrounds the Buck circuit unit, and the secondary winding of the DC/DC converter unit is uniformly distributed in the transformer unit 3, so that the output of the DC/DC converter unit can provide energy for each Buck circuit unit after rectification. The front-stage capacitor 4 is arranged between the transformer unit 3 and the Buck inductor 5. It can be seen that the energy transmission channel between the front stage and the post stage is expanded into multiple, and the distance of power transmission is extremely short, so that the transmission loss can be almost ignored. Moreover, because the distance of power transmission is extremely short, in the prior art, a DC/DC output capacitor and a Buck input capacitor which are arranged at the same time are needed, one of the DC/DC output capacitors and the Buck input capacitor can be omitted in this embodiment (namely, the front-stage capacitor in this embodiment plays a role in DC/DC output capacitance and Buck input capacitor at the same time), and the size, loss and cost are further reduced. In order to realize mutual offset of current ripples of the front-stage capacitor 4 on the input side and the output side, the working frequency of the DC/DC converter unit should be synchronous with the Buck circuit unit, that is, the frequency of the DC/DC variable-voltage circuit unit and the frequency of the Buck circuit unit have a ratio of integer. The former can be higher than the latter, and the latter can also be higher than the former.

This embodiment also shows a power module applying the two-stage voltage reduction architecture, and pins of the power module are integrated below the module. In a preferred embodiment, the power module further comprises a pin adapter board, the pin adapter board is arranged at the bottom of the power module, and the pin adapter board is electrically connected with the DC/DC converter unit and the Buck circuit unit respectively. The pin adapter board can meet the requirement of the flatness of the pins in the production process of the power module, and can flexibly deal with the requirement of the pin arrangement from the customers.

In this embodiment, the passive circuit elements are arranged in the horizontal direction without stacking in the vertical direction, and this embodiment is particularly suitable for applications with relatively high requirements on height. For example, the total height is less than 5 mm, and even 3 mm. Or when the Vbus is higher than 5 V or the working frequency of the Buck circuit unit is lower than 2 MHZ, due to the large height of the magnetic element, even if the total height of the power module can be higher than 5 mm, the magnetic element with the large height is not suitable for stacking. According to this embodiment, if a plurality of power modules shown in this embodiment are needed to be connected in parallel for a large-current application, the Buck circuit units of the two power modules can be separated by a large distance by the transformer unit, so that the load is far away from at least one output of the power module, and the performance of the power module is influenced.

Figure 4C:
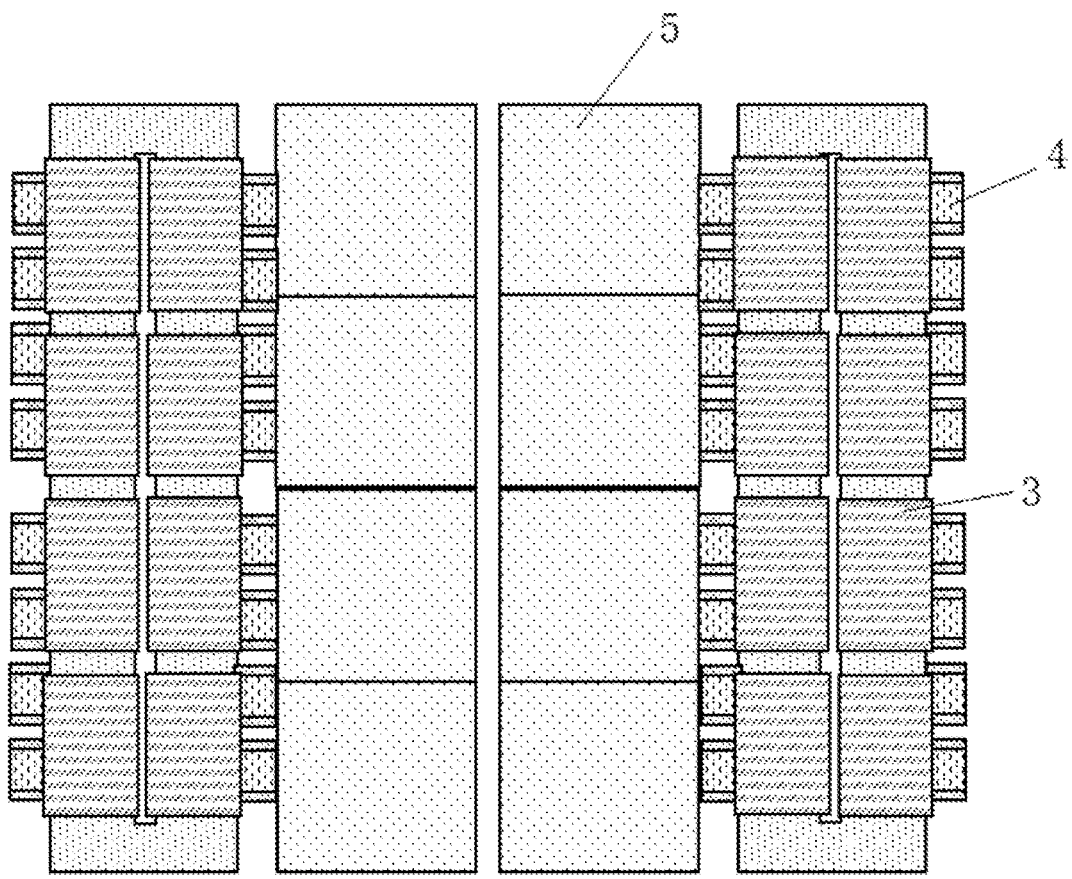
Figure 4D:
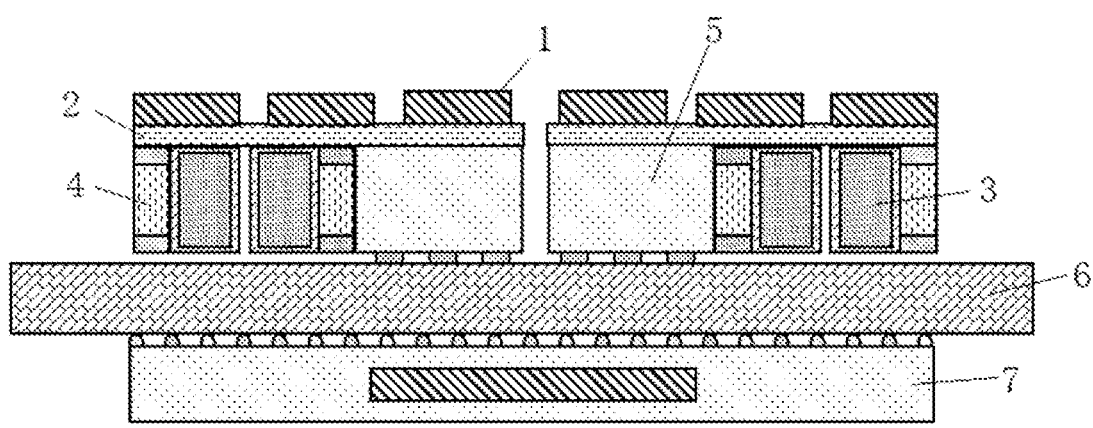

In another embodiment, as shown in FIG. 4C and FIG. 4D, it comprises two power modules, the Buck inductor 5 in each module is arranged in a one-dimensional array, the transformer unit 3 is arranged on one side of the array of the Buck inductor 5, the front-stage capacitor array is arranged between the transformer unit 3 and the Buck inductor 5 and the outer side of the transformer unit, the transformer unit 3 of the embodiment is of a long and narrow annular shape, and achieving a short distance and low-loss transmission between the two stages. Only one power module can be used when low power is needed. When high power is needed, the two power modules are arranged in parallel above the customers mainboard 6, the Buck inductor 5 array is arranged on the inner side at the position corresponding to the load 7, reducing the blind area of supplying power to the mainboard, and achieving the shortest distance to the load directly below the power module.

Figure 4E:
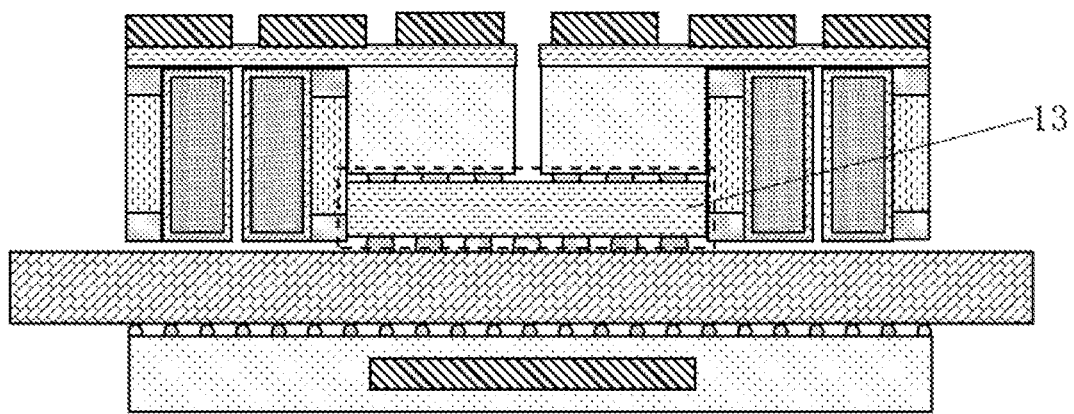

Further, in a preferred embodiment, as shown in FIG. 4E, a large number of output capacitors are needed between the Buck inductor 5 and the load 7, and the output capacitors form an array between the Buck inductor 5 and the customers mainboard 6. Herein, the height of the transformer unit 3 can be higher than that of the Buck inductor 5, so that the efficiency of the DC/DC converter unit is improved.

Embodiment 2

Figure 5A:
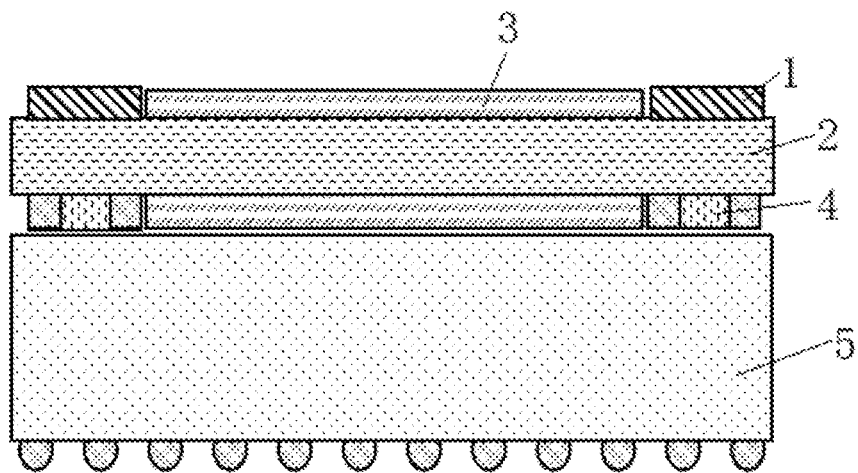
FIG. 5A to FIG. 5D are schematic structural diagrams according to one or more embodiments.
Figure 5B:
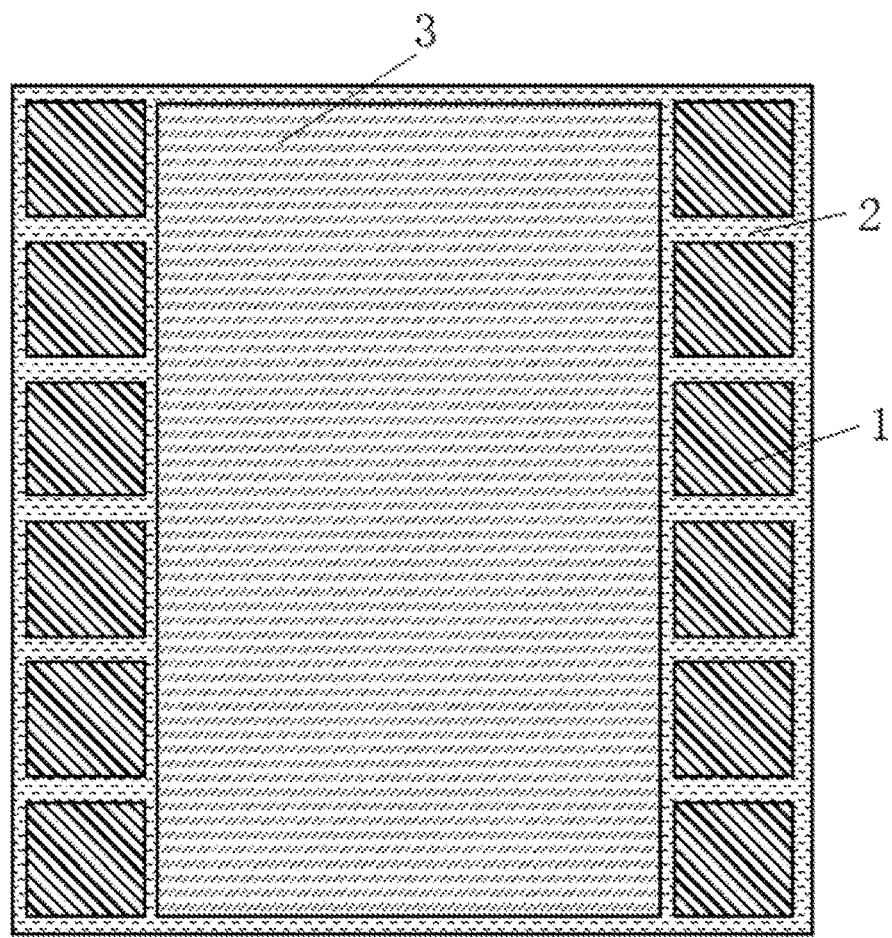
Figure 5C:
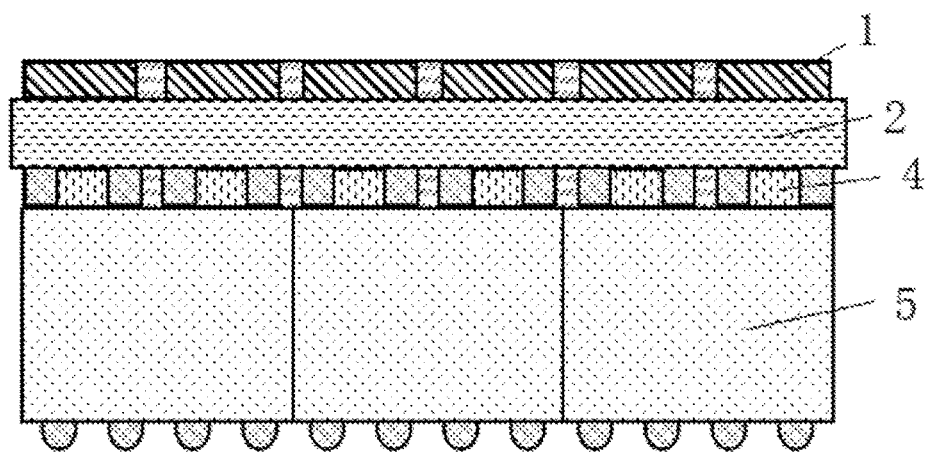

FIGS. 5A-5C show a module layout different from the Embodiment 1 (wherein FIG. 5A is a short side cross-sectional view, FIG. 5B is a top view, and FIG. 5C is a long side view). In this embodiment, the DC/DC converter unit is stacked on the Buck circuit unit and is electrically connected with the Buck circuit unit. The transformer unit 3 penetrates through the substrate 2, a DC/DC power semiconductor 1 is arranged on the upper surface of the substrate 2, and a front-stage capacitor 4 is arranged on the lower surface of the substrate 2.

Figure 5D:
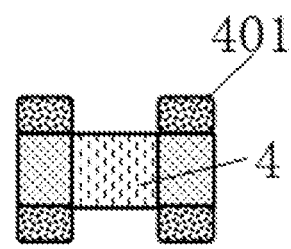

In a preferred embodiment, as shown in FIG. 5D, the front-stage capacitor 4 is a multi-layer ceramic capacitor, and the electrode of the front-stage capacitor 4 is arranged on the side edge of the front-stage capacitor 4. The upper end and the lower end of the electrode are respectively welded with the substrate 2 and the Buck circuit unit through the welding piece 401; and the front-stage capacitor 4 is electrically connected with the Buck circuit unit and other elements of the DC/DC converter unit through the welding piece 401 and the conductive layer arranged on the substrate 2, the electrode of the voltage output end of the front-stage capacitor 4 has the same function with Bus. On the other hand, the front-stage capacitor 4 and the Buck circuit unit and other elements of the DC/DC converter unit can be electrically connected nearby, and equivalent to arrange independently and counteracting the output voltage ripple of the DC/DC converter unit and the input voltage ripple of the Buck circuit unit.

In another embodiment, other types of front-stage capacitors 4 may also be used or Bus connecting nearby with low-loss may be implemented in other ways.

In this embodiment, due to the fact that the DC/DC converter unit (front-stage) and the Buck circuit unit (post-stage) share the width of the power module, the method is particularly suitable for applications with relatively high requirements on the width of the power module. For example, the total width of power module is less than 15 mm and even less than 10 mm. However, due to the fact that the height is divided, the space reserved for the magnetic element is small, and this embodiment is relatively suitable for applications with lower Vbus voltage, such as lower than 6V or high Buck working frequency, such as higher than 1 MHz. According to this embodiment, the DC/DC power semiconductor 1 is arranged in a left row and a right row, so that the DC/DC power semiconductor is particularly suitable for applications with long-strip-shaped power modules, such as the applications with the aspect ratio larger than 2.

Embodiment 3

Figure 6A:
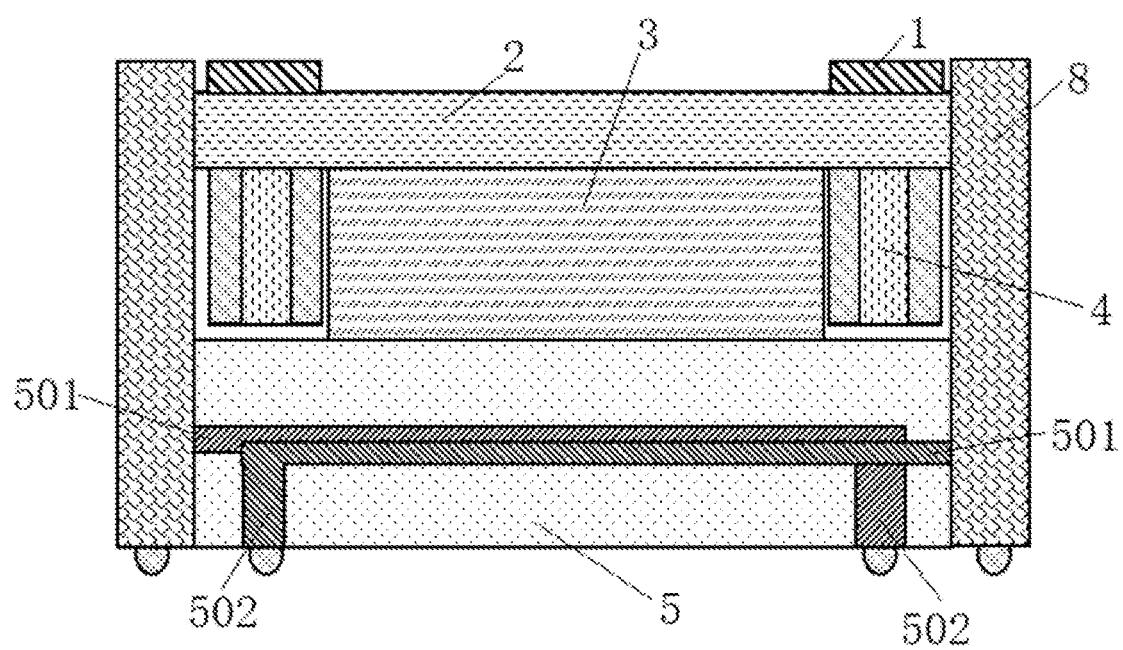
FIG. 6A to FIG. 6F are schematic structural diagrams according to one or more embodiments.
Figure 6B:
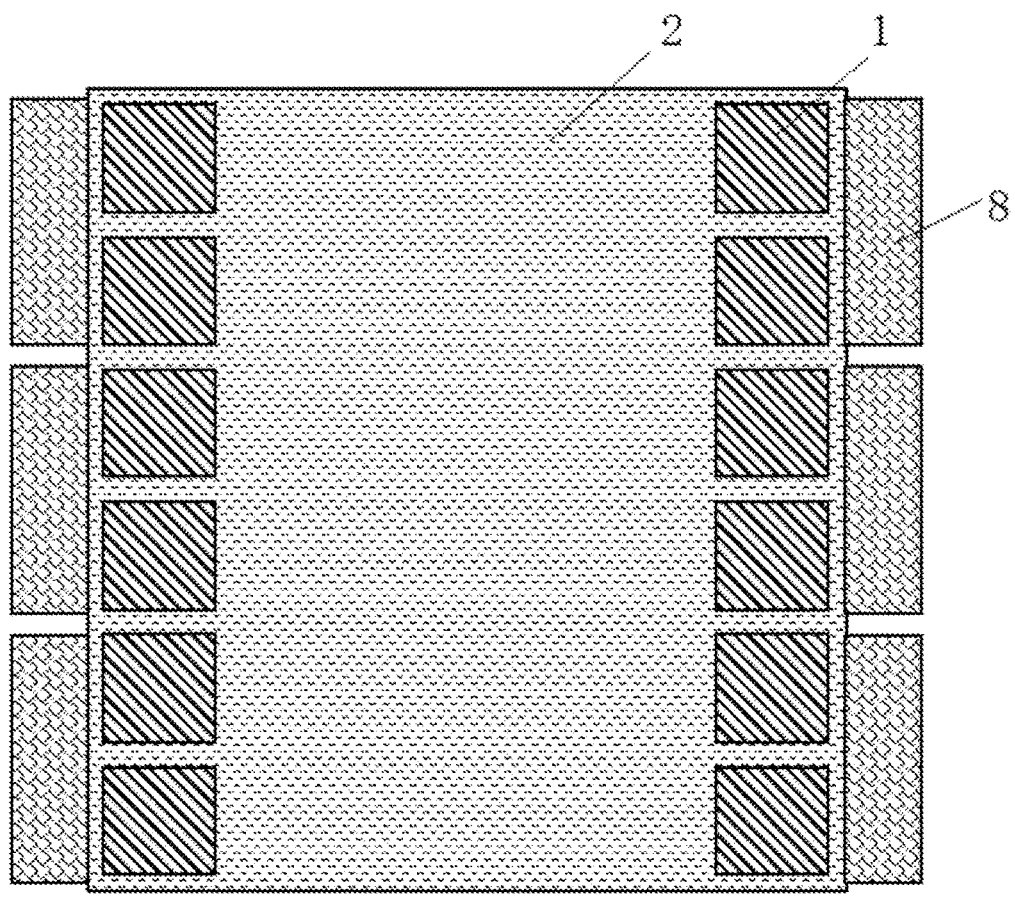
Figure 6C:
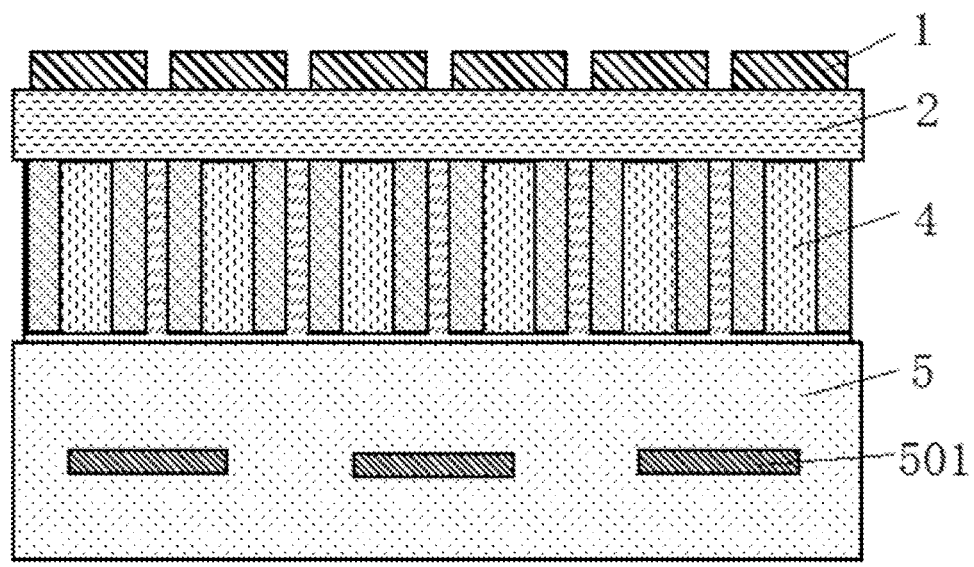

FIGS. 6A-6C illustrate another module layout (wherein FIG. 6A is a front view, FIG. 6B is a top view, FIG. 6C is a side view, and FIG. 6A additionally shows a Buck inductor winding that is not on the cross section). The difference between this embodiment and the Embodiment 2 lies in that the transformer unit 3 is located below the substrate 2; the front-stage capacitor 4 is arranged on the two sides of the transformer unit 3; the Buck inductor 5 is arranged in an array, and the Buck inductor 5 is stacked below the front-stage capacitor 4 and the transformer unit 3; and the Buck power semiconductor 8 is arranged on the two sides of the stacked body jointly formed by the substrate 2, the front-stage capacitor 4, the transformer unit 3 and the Buck inductor 5. The Buck power semiconductor 8 comprises at least one high-frequency power semiconductor bridge arm and a driver thereof. The voltage output end of the front-stage capacitor 4 provides energy nearby through the substrate 2 to the alternating-current end electrode 501 of the corresponding Buck power semiconductor 8. The alternating-current end electrode 501 is arranged on the side surface of the Buck inductor 5 and is electrically connected with the Buck power semiconductor 8. Compared with the Embodiment 2, in this embodiment, with stacking from the left to right and from up to down, the key heat sources of the power module can be respectively distributed with the direct heat dissipation channels, and the height and the width of the power module can also be balanced.

In this embodiment, the Buck inductor 5 is provided with a single-turn Buck inductance winding, the alternating-current end electrode 501 of the Buck inductance winding is arranged on the side surface of the Buck inductor 5, the direct current end electrode 502 is arranged on the bottom surface of the Buck inductor 5, most of the Buck inductance winding extends in the horizontal direction, the Buck inductance windings of two adjacent Buck inductors 5 are arranged in the opposite direction, achieving the reverse coupling of currents, and improving the dynamic response capability and the maximum current capacity of the Buck inductor 5 array.

It should be noted that for the power module without the high-voltage side element 15, a high-voltage high-frequency modulation alternating-current power pulse needs to be received during working period. Therefore, the input direct-current voltage needs to be modulated into a high-voltage and high-frequency modulation alternating-current power pulse firstly as a input voltage. With the power supply structure, the size of the power module can be reduced, and power loss generated in the applications with high alternating-current voltage is reduced too. However, the power module is not a full-function module, online debugging is needed when it is used by the customers, the high-frequency electric field generated by the high-voltage and high-frequency pulse easily causes interference to the system, and challenges are brought to the design of the customers. The best way is that these functions are also integrated into the power module.

Figure 6D:
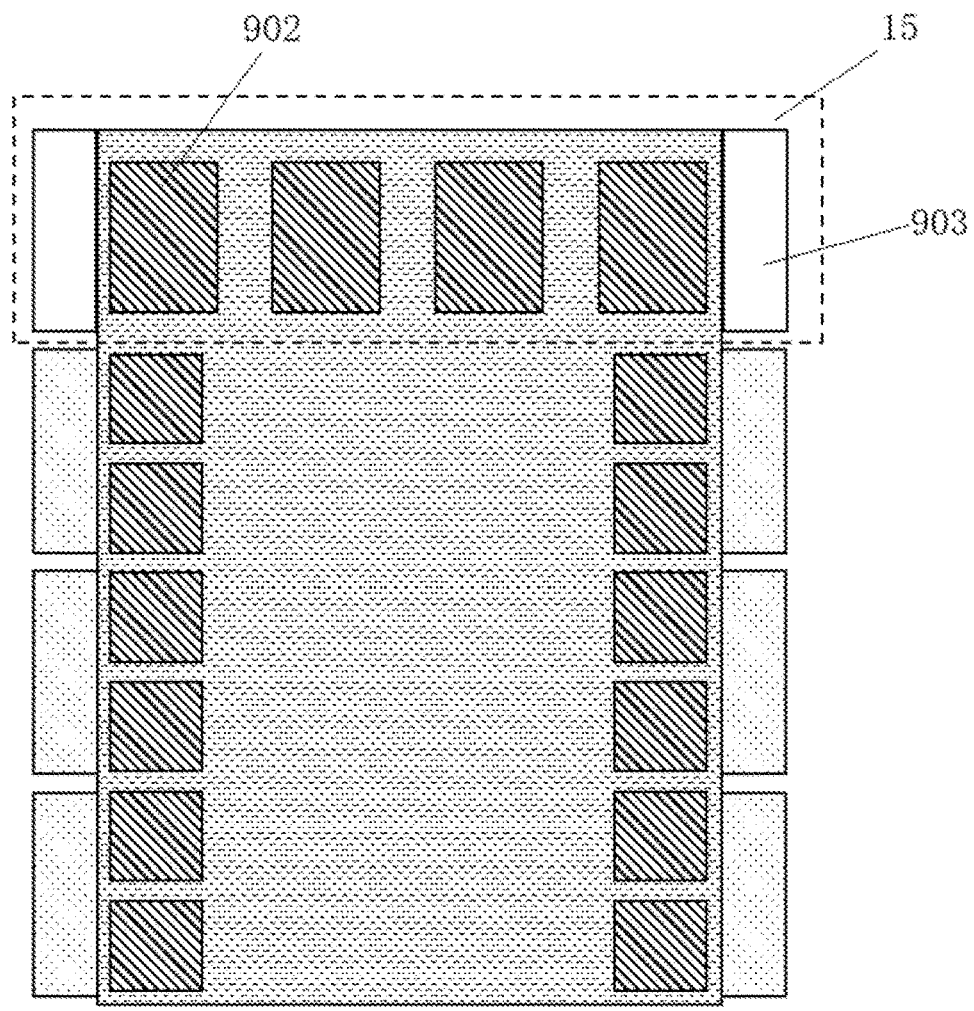
Figure 6E:
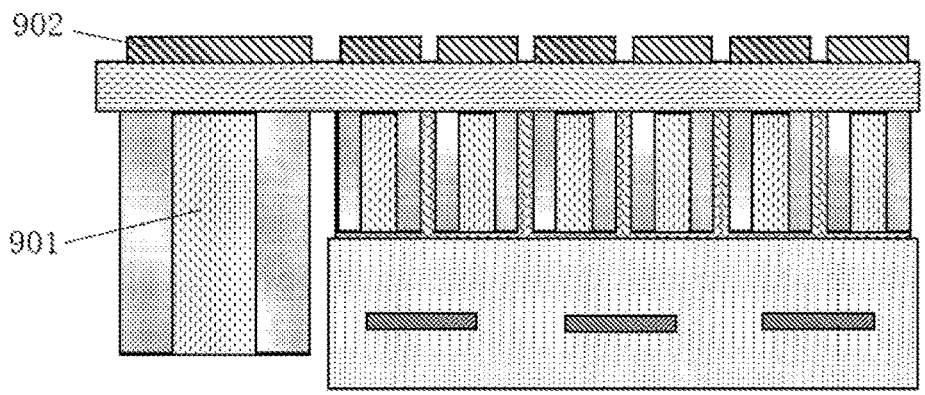

In a preferred embodiment, as shown in FIG. 6D and FIG. 6E (FIG. 6D is a top view, and FIG. 6E is a side-view cross-sectional view), the front-stage circuit unit further comprises a high-voltage-side element 15, the high-voltage-side element 15 is electrically connected to the primary winding, and the high-voltage-side element 15 comprises a high-voltage direct-current capacitor 901 and a high-voltage power semiconductor 902 which are electrically connected to each other; the high-voltage direct-current capacitor 901 is arranged on the post side below the substrate 2; and the high-voltage power semiconductor 902 is arranged at the position, corresponding to the high-voltage direct-current capacitor 901, above the substrate 2. In another embodiment, the high-voltage-side element 15 may further comprise a large-height device such as a resonant capacitor and an auxiliary power supply, and the devices can all be arranged at a position where the high-voltage direct current capacitor 901 is arranged. In this embodiment, high-voltage direct-current input can be directly received, and the high-voltage direct-current capacitor 901, the auxiliary power supply, the resonant capacitor and other large-height devices and the overall compatibility of them are particularly processed. The high-voltage-side element 15 is arranged in the extension part of the power module shown in FIG. 6D. The high-voltage power semiconductor 902 and the DC/DC power semiconductor 1 form a common heat dissipation plane. Because of the stacking height of the transformer unit 3 and the Buck inductor 5, a large-capacity high-voltage direct-current capacitor 901, or the resonant capacitor, the auxiliary power supply and other elements can be placed under the extension part of the substrate 2. The input pins can be set on the side surface of the extension part, so that the space of the power module is fully utilized, and the mechanical support of the extension part is also realized.

In a preferred embodiment, the DC/DC power semiconductor 1 and the Buck power semiconductor 8 dissipate heat through liquid immersion cooling, that is, the whole power supply structure is placed in the insulating thermal conductive liquid. The scheme is particularly suitable for the plurality of surfaces with the heat dissipation capacity, the installation of the heat-sink devices is not easy to apply, but the performance of the liquid immersion cooling can be better.

Figure 6F:
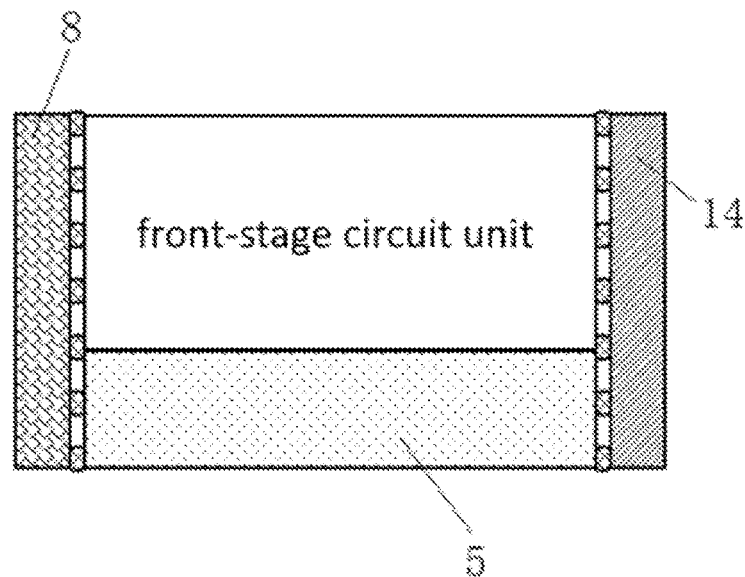

In another embodiment, as shown in FIG. 6F, the power module further comprises a controller unit 14, and the controller unit 14 is arranged on the side of the stack body, which is formed by stacking of the front-stage circuit unit and the Buck inductor 5.

Embodiment 4

Due to the current requirement of the intelligent chip is up to 1000A or even above, dozens of Buck circuit units need to be used in parallel. However, in order to realize automatic current sharing, the PWM control signals for each Buck circuit unit are different, the number of PWM control signals is equal to the number of the Buck circuit units, the size of the controller unit 14 will be very large, and layout area of the control lines will be large too.

In order to solve the above problems, a plurality of Buck circuit units share one PWM signal to reduce the number of PWM control signals. However, without the automatic current sharing, because of the tolerance of the Buck circuit units, uneven current will occur. Due to the fact that each secondary winding is coupled and restrained by the primary winding, current sharing can be achieved through magnetic coupling. Therefore, each front-stage circuit unit independently connects corresponding Buck circuit unit, and all of the Buck circuit units are controlled by one PWM control signal, (for example, the two Buck circuit units are controlled by one PWM control signal, but each of the two Buck circuit units respectively belongs to different series combinations), the current sharing capability of the front-stage circuit units enables the current sharing of the Buck circuit units, that is, the Buck circuit units are current sharing outputs. The spatial layout of each module in the embodiment can be realized according to any one of the Embodiment 1 to Embodiment 3 or through combination, or other conventional layout obtained by analogue method.

Figure 7:
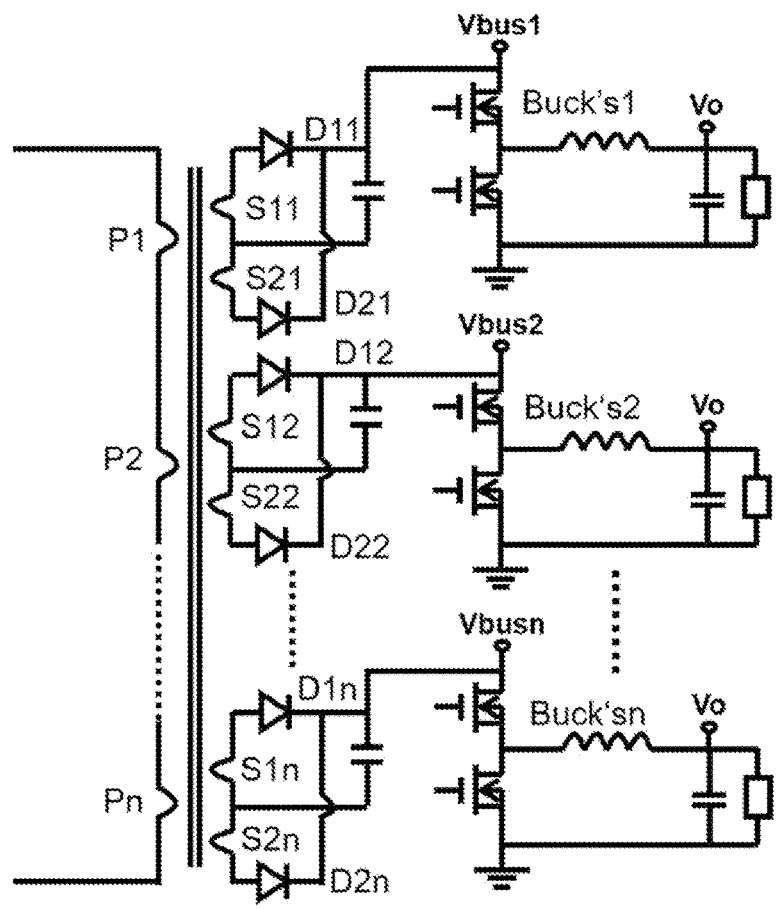
FIG. 7 is a schematic circuit diagram according to one or more embodiments.

As shown in FIG. 7, the voltage output end of each DC/DC converter unit is originally connected to the same Bus, but now, the voltage output end of each DC/DC converter unit is connected to one independent Bus, namely Vbus 1, Vbus 2 and the like. The connection resistance between the Vbus ends of the Buck circuit units controlled by one PWM signal is larger than 10 times of the maximum resistance of the corresponding low-loss electric connector, and the current between the Vbus X is smaller than the current difference of the output currents of the Buck circuit units, and there is no current between the Vbus X. Therefore, series combinations with different Vbus X are grouped. In a preferred embodiment, the number of different PWM control signals is m, and m satisfies formula (1);

$$0.8 \ Vin/Vo \leq m \leq 2 \ Vin/Vo; \tag{1}$$

wherein Vin is an input voltage, and Vo is an output voltage;

For each series combination, the PWM control signals for corresponding Buck circuit units are phase shift each other.

In a preferred embodiment, the current sampling outputs of the Buck circuit units with the same PWM control signal are summarized and is sent into the same current loop, and the currents of the Buck circuit units are controlled according to the system requirements. Compared with the prior art, the current sharing of the embodiment is realized by the magnetic coupling of the transformer unit 3, so that the complexity of the controller is greatly reduced.

Generally, if the number of Buck circuit units in the power module is greater than 8 or even greater than 16, it is necessary that a plurality of Buck circuit units share one PWM control signal.

In another embodiment, in order to consider the light load efficiency, some PWM control signals will be closed, and the number of closed PWM signals are different under the condition of different loads. Due to the reason of magnetic coupling and different on or off states of switches, the equivalent leakage inductance of the transformer unit 3 is different. On the application that the DC/DC converter unit is a resonance circuit, resonance parameters can be changed because of the different leakage inductance. Therefore, the working frequency of the DC/DC converter unit can be adjusted by different PWM control signals, so that the DC/DC converter unit always reaches the optimal state. Due to the fact that the front-stage circuit unit and the post-stage circuit unit are set in the same power module, the method for adjusting the working frequency is easily achieved by software setting in the factory stage, and details are not repeated here.

Embodiment 5

Figure 8A:
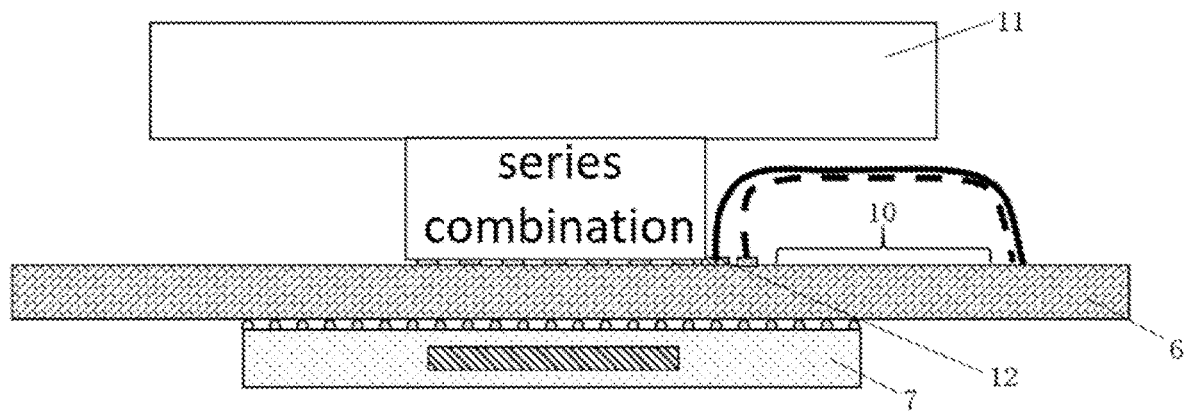
FIG. 8A to FIG. 8B are schematic structural diagrams according to one or more embodiments.
Figure 8B:
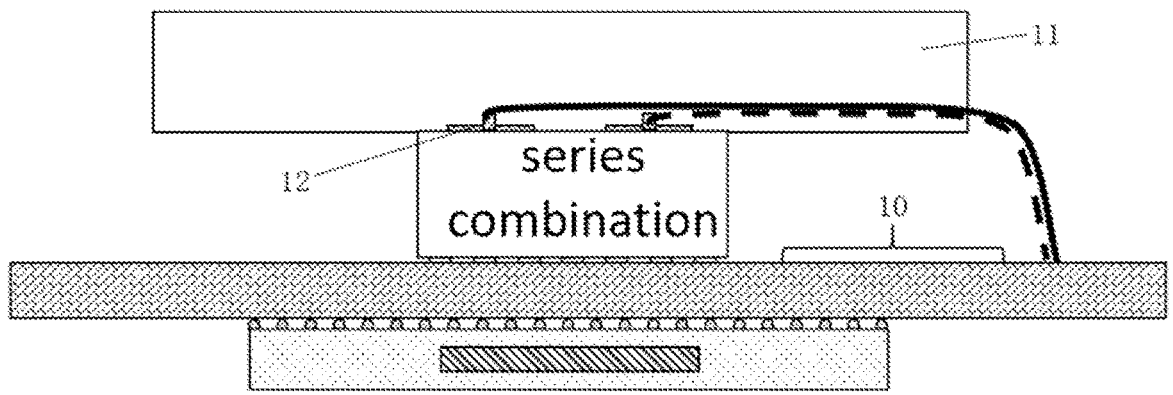

This embodiment illustrates the application with the radiator 11. Due to the fact that the input voltage Vin is higher than 12V, 48V and even 400V and 800V, and especially Vin is higher than 60V, the input voltage Vin is not suitable for wiring on the customers mainboard 6 because of the requirement of safety and insulation; and when Vin is smaller than 60V, although no safety requirement exists, the signal is prone to interfere due to the fact that the input voltage is far higher than the voltages of the signal lines. A flying wire between the customers mainboard 6 and the voltage input end 12 of the series combination is flying over the signal area 10 on the customer mainboard 6 (as shown in FIG. 8A). As shown in FIG. 8B, according to the embodiment, the input is integrated in the radiator 11 in a Busbar (ie, an input voltage electric connector), and a power contact of the input is reserved. Correspondingly, an input receiving contact is set on the series combination. When the radiator 11 is installed on the power module, the contacts of the two parties contact together, and reliable of transmitting power is achieved.

Specifically, the radiator 11 is arranged on the series combination, the radiator 11 is in thermal connection with the front-stage power semiconductor, the lower surface of the radiator 11 covers the substrate 2 (the specific structure of the substrate 2 and the series combination is not shown in the figure), an input voltage electric connector is arranged in the radiator 11, one end of the input voltage electric connector is electrically connected with the voltage input end of the front-stage circuit unit, and the other end of the input voltage electric connector extends out of the upper surface, or the side surface, or the lower surface of the radiator 11.

Embodiment 6

This embodiment illustrates that the front-stage circuit unit and the post-stage circuit unit are both Buck circuit units (wherein the front-stage circuit unit is a first Buck circuit unit, and the post-stage circuit unit is a second Buck circuit unit), wherein the front-stage passive circuit element comprises a first Buck inductor, and the post-stage passive circuit element comprises a second Buck inductor; the voltage output end of the first Buck inductor is electrically connected with the voltage input end of the corresponding second Buck circuit unit in the same series combination through the low-loss electric connector, and the layout and other details of each module in the embodiment can refer to Embodiment 1 to Embodiment 5.

This embodiment is suitable for applications where the voltage reduction rate of the front-stage circuit unit is less than 8 times.

In a preferred embodiment, the front-stage circuit unit is molded to form a package body, the upper surface of the substrate and the front-stage power semiconductor on the substrate is encapsulated by molding compound. The encapsulation method has the advantages that the reliability of the power module is improved, the radiator is convenient to assemble, the influence of liquid heat dissipation to the devices and the substrate is reduced, and particularly, when the input voltage is larger than 60V, the safety distance can be greatly reduced, and the size of the power module can be reduced correspondingly.

It should be noted that relational terms, such as first and second, etc., are used herein to distinguish one entity or operation from another entity or operation without necessarily requiring or implying any such actual relationship or order between these entities or operations. Moreover, the terms "comprising," or any other variant thereof are intended to cover a non-exclusive inclusion, such that a process, method, article, or apparatus comprising a series of elements includes not only those elements, but also other elements not explicitly listed, or elements inherent to such a process, method, article, or apparatus. In the absence of more restrictions, the sentence "includes one. Further identical elements are also present in the process, method, article, or apparatus that includes the element.

The application has the following beneficial effects:
(1) The energy transmission channel provided by the invention is provided with a plurality of front and post stages, the distance is extremely short, and the transmission loss is greatly reduced, so that the energy transmission channel is suitable for applications with relatively low intermediate voltage (Vbus) and corresponding high current;
(2) Due to the fact that the distance between the energy transmission channel between the front-stage and the post-stage is extremely short, the front-stage capacitor can play the role of a DC/DC output capacitor and a Buck input capacitor at the same time, that is, one capacitor is omitted, the output voltage ripple of the DC/DC variable-voltage circuit unit and the input voltage ripple of the Buck circuit unit can still be filtered, and the size, loss and cost are further reduced.
(3) The Buck circuit unit can realize current sharing through magnetic coupling, so that the same PWM signal can be shared, so that the number of PWM signals is greatly reduced, and the complexity of the controller is greatly reduced.

What is claimed is:

1. A power supply architecture of a two-stage voltage reduction series structure, comprising:
   at least two series combinations, wherein each of the at least two series combination comprises at least one front-stage circuit unit and at least one post-stage circuit unit, and an input end of each of the at least one front-stage circuit unit is electrically connected;
   wherein the at least one front-stage circuit unit is used for converting an input voltage to an intermediate voltage;
   wherein the at least one post-stage circuit unit is used for converting the intermediate voltage to an output voltage;
   wherein the at least one front-stage circuit unit comprises a front-stage power semiconductor and a front-stage passive circuit element which are electrically connected with each other, and the at least one post-stage circuit unit comprises a post-stage power semiconductor and a post-stage passive circuit element which are electrically connected with each other;
   wherein in each of the at least two series combination, an output end of the at least one front-stage circuit unit and an input end of the at least one post-stage circuit unit are electrically connected through a low-loss electric connector.

2. The power supply architecture of claim 1, wherein a working frequency of the at least one front-stage circuit unit is an integral multiple of a working frequency of the at least one post-stage circuit unit, or the working frequency of the at least one post-stage circuit unit is an integral multiple of the working frequency of the front-stage circuit unit.

3. The power supply architecture of claim 1, wherein the at least one post-stage circuit unit is a Buck circuit unit.

4. The power supply architecture of claim 3, wherein the at least one front-stage circuit unit is a DC/DC converter unit;
   wherein the front-stage passive circuit element comprises a front-stage capacitor, and wherein the front-stage power semiconductor comprises a rectifying element;
   wherein the front-stage passive circuit element further comprises a primary winding and a secondary winding corresponding to the primary winding, and the primary winding and the corresponding secondary winding are coupled nearby;
   wherein the secondary winding and the rectifying element are connected in series and then connected to the two ends of the front-stage capacitor in parallel;
   wherein the primary windings of the front-stage circuit units are mutually connected in series and form a transformer unit together with the corresponding secondary windings;
   wherein a voltage output end of the front-stage capacitor is electrically connected with a voltage input end of a corresponding Buck circuit unit in the same series combination through the low-loss electric connector.

5. The power supply architecture of claim 4, wherein the Buck circuit unit is set to be in different on or off states to different load states;
   wherein the DC/DC converter circuit unit is a resonant circuit unit, and the working frequency of the resonant circuit unit is set to be different preset values to the on or off state of the Buck circuit unit.

6. A power module applying the power supply architecture of claim 4, the power module comprising a substrate, wherein the front-stage power semiconductor is arranged above the substrate and/or in the substrate, the front-stage capacitor is arranged below the substrate, and at least one part of the transformer unit is located below the substrate.

7. The power module of claim 6, wherein the front-stage capacitor is arranged on at least one side of the transformer unit;
   wherein the post-stage passive circuit element comprises a Buck inductor, the Buck inductor is arranged in an array, and the Buck inductor is stacked below the front-stage capacitor and/or the transformer unit;
   wherein the post-stage power semiconductor is arranged on at least one side of a stack formed by a substrate, a front-stage capacitor, a transformer unit and a Buck inductor.

8. The power module of claim 7, wherein the Buck inductor is provided with a single-turn Buck inductance winding, and the alternating current end of the Buck inductance winding is arranged on a first side surface of the Buck inductor;
   wherein a DC end of the Buck inductance winding is arranged on the lower surface of the Buck inductor and is close to a second side surface opposite to the first side surface.

9. The power module of claim 8, wherein the Buck inductor is arranged in an array according to a mode that the first side surfaces of the adjacent Buck inductors are alternately arranged left and right.

10. The power module of claim 6, wherein the post-stage power semiconductor is disposed above the substrate and/or inside the substrate.

11. The power module of claim 10, wherein the front-stage power semiconductor and the post-stage power semiconductor are subjected to heat dissipation through liquid immersion cooling.

12. The power module of claim 6, wherein the at least one front-stage circuit unit further comprising a high-voltage-side element, the high-voltage-side element is electrically connected with the primary winding, and the high-voltage-side element comprises a high-voltage conversion power semiconductor and a higher element which are electrically connected with each other;
   wherein at least one side of the transformer unit is provided with a higher element;
   wherein at least a portion of the higher element is disposed below the substrate;
   wherein the high-voltage conversion power semiconductor is arranged above the substrate; compared with the transformer unit, the high-voltage conversion power semiconductor and the higher element are arranged on the same side, and the higher element is an auxiliary power supply and/or a resonant capacitor and/or a high-voltage direct-current capacitor.

13. The power module of claim 6, wherein an electrode of the front-stage capacitor is arranged on the side edge, and the low-loss electric connector is the electrode of the front-stage capacitor.

14. The power module of claim 6, wherein the post-stage passive circuit element further comprises an output capacitor, and the output capacitor is arranged below the Buck inductor.

15. The power module of claim 6, further comprising a controller unit,
   wherein the controller unit is arranged on at least one side of a stacked body jointly formed by the substrate, the front-stage capacitor, a front-stage transformer unit and the Buck inductor.

16. The power supply architecture of claim 3, wherein at least two Buck circuit units are first Buck circuit units, the first Buck circuit units jointly receive the same PWM signal for control, and the first Buck circuit units are respectively in different series combinations.

17. The power supply architecture of claim 16, wherein the low-loss electric connector corresponding to the first Buck circuit unit is a first electric connector, and the interconnection resistance between the first electric connectors is larger than 10 times of a maximum resistance of the first electric connector.

18. The power supply architecture of claim 16, wherein the total number of different PWM signals is m, and m satisfies a formula (1);

$$0.8\ Vin/Vo \le m \le 2\ Vin/Vo; \qquad (1)$$

wherein Vin is an input voltage, and Vo is an output voltage;

wherein for each of the at least two series combination, if a series combination comprises more than one Buck circuit unit, mutually staggered phases of PWM signals received by each Buck circuit unit included in the series combination are mutually staggered.

19. The power supply architecture of claim 16, wherein a current sampling output of each first Buck circuit unit is controlled by the same current loop after being summarized.

20. The power supply architecture of claim 1, wherein the at least one front-stage circuit unit is a first Buck circuit unit, and the at least one post-stage circuit unit is a second Buck circuit unit;

wherein the front-stage passive circuit element comprises a first Buck inductor, and the post-stage passive circuit element comprises a second Buck inductor;

wherein a voltage output end of the first Buck inductor is electrically connected with a voltage input end of a corresponding second Buck circuit unit in the same series combination through the low-loss electric connector.

21. A power module applying the power supply architecture of claim 1, the power module comprising a substrate;

wherein the front-stage power semiconductor is disposed above the substrate and/or inside the substrate;

wherein the post-stage passive circuit element is disposed below the substrate, and at least a portion of the front-stage passive circuit element is located below the substrate.

22. The power module of claim 21, wherein the post-stage passive circuit elements are arranged in an aggregation mode, and the front-stage passive circuit elements are arranged around the post-stage passive circuit elements in a surrounding mode.

23. The power module of claim 21, wherein the post-stage passive circuit element is arranged in a one-dimensional array, and the front-stage passive circuit element is arranged in an array on at least one side of the array of the post-stage passive circuit element.

24. The power module of claim 21, wherein the post-stage passive circuit element is stacked below the corresponding front-stage passive circuit element.

25. The power module of claim 21, wherein a voltage input end of the at least one front-stage circuit unit is located on a upper surface of the power module;

wherein the power module further comprises a radiator arranged above the substrate, wherein the radiator is thermally connected with the front-stage power semiconductor, a lower surface of the radiator at least covers the substrate, an input voltage electrical connector is arranged in the radiator, one end of an input voltage electrical connector is electrically connected with a voltage input end of the power module, and the other end of the input voltage electrical connector extends out of a side surface of the radiator or extends out of the part, not covering the substrate, of the lower surface of the radiator or extends out of the upper surface of the radiator.

26. The power module of claim 21, further comprising a package body, wherein at least a part of the front-stage power semiconductor is arranged above the substrate, the plastic package body is arranged on the upper surface of the substrate, and the plastic package body wraps the front-stage power semiconductor arranged above the substrate.

27. The power module of claim 21, further comprising a pin adapter board, wherein the pin adapter board is arranged at a bottom of the power module, and the pin adapter board is electrically connected with the at least one front-stage circuit unit and the at least one post-stage circuit unit respectively.

* * * * *